(12) United States Patent
Baskaran et al.

(10) Patent No.: US 12,375,531 B2
(45) Date of Patent: Jul. 29, 2025

(54) CSCF RESTORATION

(71) Applicant: NOKIA TECHNOLOGIES OY, Espoo (FI)

(72) Inventors: Sugumar Baskaran, Bangalore (IN); Jayakumar Jayaraman, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/508,518

(22) Filed: Oct. 22, 2021

(65) Prior Publication Data

US 2022/0131910 A1    Apr. 28, 2022

(30) Foreign Application Priority Data

Oct. 23, 2020  (IN) .............................. 202041046348

(51) Int. Cl.
| | |
|---|---|
| *H04L 65/1016* | (2022.01) |
| *H04L 65/1046* | (2022.01) |
| *H04L 65/1101* | (2022.01) |
| *H04W 8/22* | (2009.01) |

(52) U.S. Cl.
CPC ...... *H04L 65/1016* (2013.01); *H04L 65/1046* (2013.01); *H04L 65/1101* (2022.05); *H04W 8/22* (2013.01)

(58) Field of Classification Search
CPC .......................... H04L 61/4588; H04L 65/1101
See application file for complete search history.

(56) References Cited

U.S. PATENT DOCUMENTS

| | | | |
|---|---|---|---|
| 2010/0062767 A1 | 3/2010 | Leis et al. | |
| 2011/0252141 A1* | 10/2011 | Boberg | H04L 67/54 |
| | | | 709/226 |
| 2013/0091546 A1* | 4/2013 | Shen | H04L 69/40 |
| | | | 726/3 |
| 2018/0007612 A1* | 1/2018 | Jahangir | H04L 65/1073 |

OTHER PUBLICATIONS

3GPP TS 23.380 (Year: 2015).*
Extended European Search Report for European Application No. 21203637.0 dated Mar. 4, 2022, 10 pages.

(Continued)

*Primary Examiner* — Nicholas P Celani
(74) *Attorney, Agent, or Firm* — Alston & Bird LLP (57) ABSTRACT

It is provided a method comprising: instructing a user data repository to store subscription data, wherein the subscription data comprise information on a notification from the user data repository to which a call session control function subscribed by a subscription; monitoring whether the call session control function has an indication that the call session control function might have lost the subscription data; getting the subscription data from the user data repository for the call session control function if the call session control function has the indication that the call session control function might have lost the subscription data; restoring the subscription data at the call session control function according to the subscription data got from the user data repository.

18 Claims, 5 Drawing Sheets

(56) References Cited

OTHER PUBLICATIONS

"3rd Generation Partnership Project; Technical Specification Group Core Network and Terminals; 5G System; Home Subscriber Server (HSS) Services for interworking with the IP Multimedia Subsystem (IMS); Stage 3 (Release 16)", 3GPP TS 29.562 v16.1.0, (Jul. 2020), 185 pages.

"3rd Generation Partnership Project; Technical Specification Group Core Network and Terminals; IMS Restoration Procedures (Release 16)", 3GPP TS 23.380 v16.2.0, (Dec. 2019), 56 pages.

Intention to Grant for European Application No. 21203637.0 dated Jul. 8, 2024, 32 pages.

* cited by examiner

CSCF RESTORATION

CROSS-REFERENCE TO RELATED APPLICATIONS

This application claims priority to Indian Application No. 202041046348, filed Oct. 23, 2020, the entire contents of which are incorporated herein by reference.

FIELD OF THE INVENTION

The present disclosure relates to restoration of a call session control function, in particular a S-CSCF.

ABBREVIATIONS

3GPP $3^{rd}$ Generation Partnership Project
3G/4G/5G $3^{rd}/4^{th}/5^{th}$ Generation
API Application Programming Interface
AS Application Server
CSCF Call Session Control Function
HSS Home Subscriber Server
HTTP Hypertext Transfer Protocol
I-CSCF Interrogating Call Session Control Function
IE Information Element
IMPU IMS Public User Identity.
IMS IP Multimedia Subsystem
IP Internet Protocol
NF Network Function
P-CSCF Proxy Call Session Control Function
SBI Service-based Interface
S-CSCF Serving Call Session Control Function
SDM Subscriber Data Management
SIP Session Initiation Protocol
TS Technical Specification
UDM User Data Management
UE User Equipment
URI Uniform Resource Identifier
UUID Universally Unique Identifier

BACKGROUND OF THE INVENTION

Figure 1:
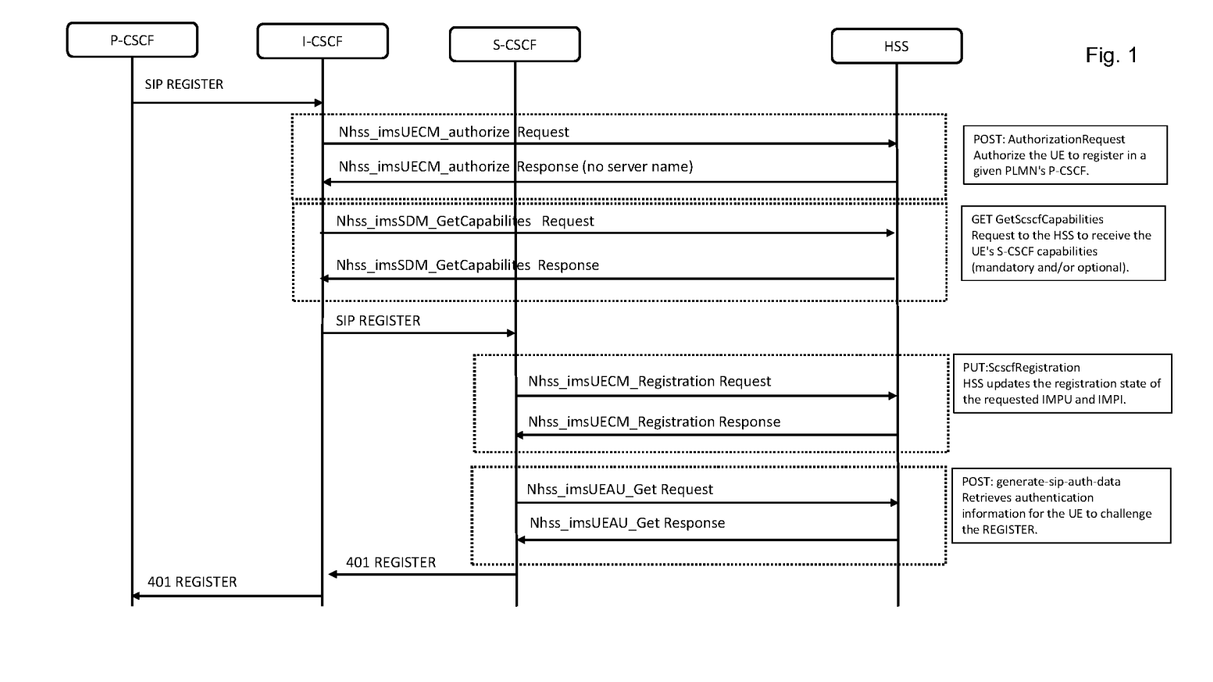
FIG. 1 shows authentication register according to 3GPP TS 29.562.

Extract from 3GPP TS 29.562, V16.1.0:
The SBI capable HSS offers the following services via the Nhss_ims interface:
  Nhss_imsUEContextManagement Service
  Nhss_imsSubscriberDataManagement Service
  Nhss_imsUEAuthentication Service
  Nhss_imsUEContextManagement Service:
For the Nhss_imsUEContextManagement service the following service operations are defined:
  Registration
  DeregistrationNotification
  Deregistration
  Authorize
  Update
  RestorationInfoGet
  RestorationInfoUpdate
  IMS restoration procedures are specified in 3GPP TS 23.380.
The Nhss_imsUEContextManagement Service is used by Consumer NFs (I-CSCF/S-CSCF) to:
  register at the HSS by means of the Registration service operation (S-CSCF)
  get notified by means of the DeregistrationNotification service operation when HSS decides to deregister the registered consumer NF (S-CSCF)
  deregister from the HSS by means of the Deregistration service operation (S-CSCF)
  request registration authorization from HSS by means of the Authorize service operation (I-CSCF)
  update registration information stored at the HSS by means of the Update service operation (S-CSCF)
  retrieve Restoration Information stored at the HSS by means of the RestorationInfoGet service operation (S-CSCF)
  update Restoration Information stored at the HSS by means of the RestorationInfoUpdate service operation (S-CSCF)
Nhss_ims SubscriberDataManagement Service:
  For the Nhss_imsSubscriberDataManagement service the following service operations are defined:
  Get
  Subscribe to notification of data changes and UE reachability for IP
  Unsubscribe to notification of data changes and UE reachability for IP
  Notification of data changes and UE reachability for IP
  Update
  The Nhss_imsSubscriberDataManagement Service is used by Consumer NFs (S-CSCF, IMS-AS) to subscribe to notifications relevant to the consumer NF. In particular, it may be used to subscribe individually (per UE) to notifications relevant to the consumer NF for serving the UE, such as notifications due to changes to a user profile (e.g. IMS profile) of the UE.
  Each subscription is characterized by subscription data. The subscription data comprise typically:
    1. nfInstanceId: The NF instance id of the S-CSCF.
    2. callbackReference: S-CSCF URI provided for callback from Nhss/UDM.
    3. monitoredResourceUris: A set of URIs that identify the resources for which a change triggers a notification. The URI shall take the form of either an absolute URI or an absolute-path.
    4. expiry time: Time till the successfully created subscription will be valid.
    5. Subscription ID: URI of the created resource for the subscription in Nhss/UDM
  The Nhss_imsSubscriberDataManagement Service may be further used by I-CSCF to retrieve S-CSCF capabilities or the assigned S-CSCF, from the SBI capable HSS by means of the Get service operation.
  If the consumer NF supports the feature "sharedData", the retrieved individual subscription data for the UE may contain shared data identifier identifying additional parts of subscription data shared by several UEs. If so, the Nhss_imsSubscriberDataManagement Service is also used by Consumer NFs to retrieve shared subscription data from the HSS by means of the Get service operation.
  A UE registers at S-CSCF by two registration steps. A first registration step (shown in FIG. 1, taken from 3GPP TS 29.562) to authenticate the UE, and a second registration step to register at the S-CSCF.
  The SBI between S-CSCF and HSS is based on HTTP requests (PUT, POST, GET, PATCH, etc.). HTTP responses numbered as 2XX (i.e. 200 . . . 299) mean that the HTTP request was successful.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: instruct a user data repository to store subscription data, wherein the subscription data comprise information on a notification from the user data repository to which a call session control function subscribed by a subscription; monitor whether the call session control function has an indication that the call session control function might have lost the subscription data; get the subscription data from the user data repository for the call session control function if the call session control function has the indication that the call session control function might have lost the subscription data; restore the subscription data at the call session control function according to the subscription data got from the user data repository.

According to a second aspect of the invention, there is provided a method comprising: instructing a user data repository to store subscription data, wherein the subscription data comprise information on a notification from the user data repository to which a call session control function subscribed by a subscription; monitoring whether the call session control function has an indication that the call session control function might have lost the subscription data; getting the subscription data from the user data repository for the call session control function if the call session control function has the indication that the call session control function might have lost the subscription data; restoring the subscription data at the call session control function according to the subscription data got from the user data repository.

The method of the second aspect may be a method of restoring.

According to a third aspect of the invention, there is provided a computer program product comprising a set of instructions which, when executed on an apparatus, is configured to cause the apparatus to carry out the method according to the second aspect. The computer program product may be embodied as a computer-readable medium or directly loadable into a computer.

According to some embodiments of the invention, at least one of the following advantages may be achieved:
Duplicated subscriptions in user data repository are avoided;
Less load on user data repository in case S-CSCF lost information on notifications;
Faster restore of S-CSCF such that interruption for user is shorter.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

HSS and UDM may be considered as synonyms in the present application, unless otherwise indicated. They are examples of a user data repository.

In Service Based Interface reference model, S-CSCF Registration, S-CSCF Restoration and S-CSCF Subscription towards Nhss are done separately in the following sequence:
1. User registration.
2. Subscription for notifications triggered by data change and user UE reachability.
3. Storing of user restoration registration info towards Nhss (i.e. a network function serving as HSS).

Assume the following scenario: After a successful registration of a UE at S-CSCF, S-CSCF processes have to restart, or the registration info is lost somehow. The S-CSCF gets any request for that subscriber (say SUBSCRIBE or INVITE). This request leads to restoration of registration Info from UDM. Restoration info is information required for the S-CSCF to handle traffic for a registered user. S-CSCF instructs UDM to store the restoration information.

As per 3GPP TS 29.562 V16.1.0, the restoration procedure defines only restoration of registration related information for a subscriber but the restoration information does not comprise any subscription data (in particular: ImsSdmSubscription data), such as subscriptions upon registration. In Section 6.1.6.2.7, RestorationInfo does not have any fields for restoring the ImsSdmSubscription data.

As Subscription to notifications on changes of data in the HSS (e.g. IMS SDM Data) is not restored at S-CSCF, it does not know about the active subscriptions it has done during or after the registration time, but UDM will have the subscriptions in active state.

As one option to maintain the same subscriptions even after the subscription data are lost at S-CSCF, S-CSCF may re-trigger the subscription (i.e. subscribe again to the same notification). However, this will be an extra subscription in UDM and the earlier subscription would be stale and it has to be cleared up after expiry.

The subscription considered here may be individual for a UE, for a group of UEs, or general (independent from any UE). As an example for a subscription individual for a UE, a subscription to notifications triggered by changes of IMS SDM Subscriber level data may be considered.

Figure 2:
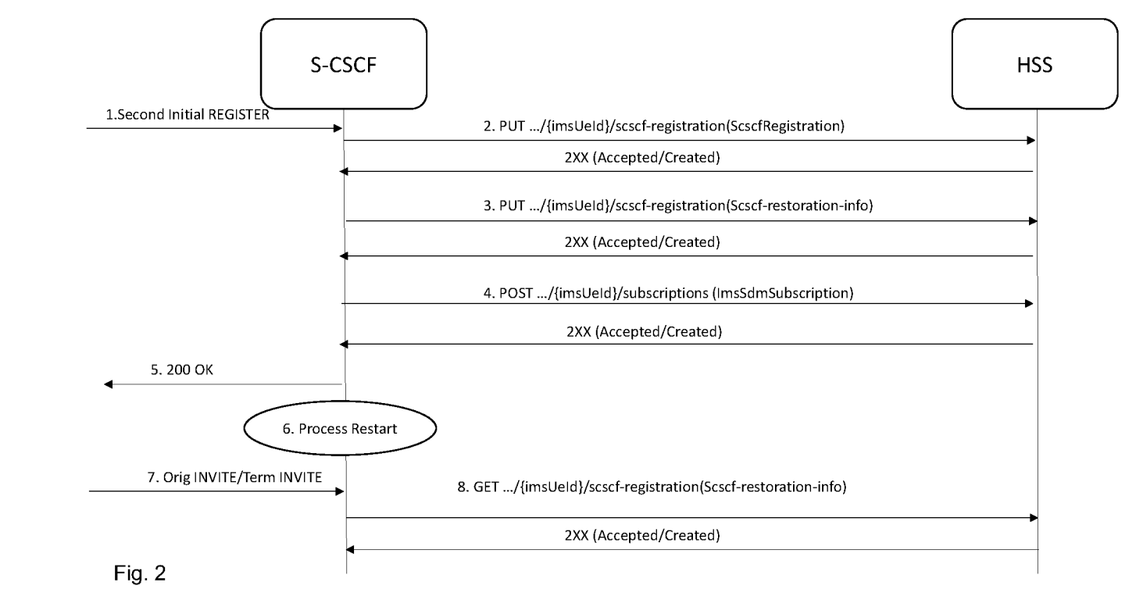
FIG. 2 shows a conventional message flow.

The problem is shown in the message flow of FIG. 2. FIG. 2 is a pictorial representation of the problem described above. For simplicity sake, the message flows of FIGS. 2 to 4 start after successful "Authenticated REGISTER" (shown in FIG. 1).

1. S-CSCF receives Register from UE with auth information.
2. The S-CSCF sends HTTP2 PUT request for resource representing the UE's S-CSCF registration to update or create S-CSCF registration information. The S-CSCF shall check whether there is a reg-id parameter in the Contact header in the SIP REGISTER message. If a reg-id parameter exists, the S-CSCF shall indicate to the HSS that the registration is related to a multiple registration as specified in clause 4.2.3 of 3GPP TS 23.380.
   a. The HSS updates the scscfRegistration resource by replacing it with the received resource information (e.g. S-CSCF name, state of the related IMS public identity based on the imsRegistrationType received) and responds with "204 No Content" or "200 OK" with the updated resource information and HSS supported features.
3. The S-CSCF sends a PUT request to the resource representing the UE's S-CSCF restoration information to create S-CSCF restoration information.
   a. HSS stores the received S-CSCF restoration info and responds with HTTP Status Code "201 created".
4. S-CSCF (service consumer) sends a POST request to the HSS (parent resource, service provider) comprising a collection of subscriptions ( . . . {imsUeId}/sdm-subscriptions), to create a subscription as present in message body.
   The HSS responds with "201 Created" with the message body containing a representation of the created subscription. The Location HTTP header shall contain the URI of the created subscription (subscription ID).
5. S-CSCF sends 200 OK in response to the REGISTER message 1. This step can done before 4 as well, depending on implementation.
6. The S-CSCF processes have to be restarted such that registration info and subscription data are lost.
7. S-CSCF receives another request (e.g. Invite) for the UE.
8. Since S-CSCF does not have registration info for the UE, it retrieves the registration info from HSS by GET request to the restoration info stored in the HSS. HSS provides the restoration info comprising the registration info by 2XX response.

However, the restoration info does not comprise any ImsSdmsubscription data. Potentially, S-CSCF may subscribe to the same notifications again. However, in this case, the previous subscriptions are still active on the HSS until they expire, without any use.

Some example embodiments of the invention provide a solution to solve the lack of subscription data at S-CSCF after they are lost (e.g. due to a process restart) in spite of the existing restoration procedure. The subscription data may be for a subscriber, but they may be for a group of subscribers or independent from a subscriber, too.

In UE IMS registration flow, typically after successful update of scscf-registration & scscf-restoration-info (through PUT request) in UDM, for that subscriber, S-CSCF performs one or more subscriptions for the UE. Once this is successful, S-CSCF has both registration info and subscription data for the subscriber.

According to some example embodiments of the invention, RestorationInfo comprises an extra attribute(e.g. named imsSdmSubscriptions), so that S-CSCF is able to restore both registration info and subscription data during restoration. As an example, the extra attribute might be added as in the Table 1:

| Attribute name | Data type | P | Cardinality | Description |
| --- | --- | --- | --- | --- |
| path | string | M | 1 | This IE shall contain a comma separated list of SIP proxies in the Path header. |
| contact | string | M | 1 | This IE shall contain the Contact Addresses and Parameters in the Contact header. |
| initialCSeqSequenceNumber | Uint32 | O | 1 | This IE contains the sequence number of the CSeq header field contained in the initial successful REGISTER request. |
| callIdSipHeader | string | O | 1 | This IE contains the information in the Call-ID header. |
| uesubscriptionInfo | UeSubscriptionInfo | O | 1 | This IE contains the UE's subscription information. |
| pcscfSubscriptionInfo | PcscfSubscriptionInfo | O | 1 | This IE contains the P-CSCF's subscription information. |
| imsSdmSubscriptions | map(ImsSdmSubscription) | O | 1 . . . N | A map (list of key-value pairs where subscriptionId serves as key) of imsSdmSubscriptions. |

Table 1: RestorationInfo According to Some Example Embodiments of the Invention

The extra attribute (named e.g. imsSDMSubscription) comprises a map of 1 to N entries with the subscriptionId as a key, and the values comprises at least one of
1. nfInstanceId: The NF instance id of the S-CSCF.
2. callbackReference: S-CSCF URI provided for callback from Nhss/UDM.
3. monitoredResourceUris: A set of URIs that identify the resources for which a change triggers a notification. The URI shall take the form of either an absolute URI or an absolute-path.
4. expiry time: Time till the successfully created subscription will be valid.

Subscription ID is the URI of the created resource for the subscription in Nhss/UDM. Typically, each entry in the map comprises all the values which characterize the subscription. However, in some cases, S-CSCF may replace one or more of the values by a default value. In such cases, the respective value need not be present in the RestorationInfo.

The addition of the new attribute might be reflected in a modification in the API as defined in the 3GPP standard, as shown in Table 2:

```
RestorationInfo:
    description: The information relevant to a specific
registration required for an S-CSCF to handle the requests for a
user
    type: object
    required:
      - path
      - contact
    properties:
      path:
        type: string
      contact:
        type: string
      initialCSeqSequenceNumber:
        $ref: 'TS29571_CommonData.yaml#/components/schemas/Uint32'
      callIdSipHeader:
        type: string
      uesubscriptionInfo:
        $ref: '#/components/schemas/UeSubscriptionInfo'
      pcscfSubscriptionInfo:
        $ref: '#/components/schemas/PcscfSubscriptionInfo'
      imsSdmSubscriptions:
        description: A map (list of key-value pairs where
subscriptionId serves as key) of ImsSdmSubscription
        type: object
        additionalProperties:
          $ref:
'TS29562_Nhss_imsSDM.yaml#/components/schemas/ImsSdmSubscription'
```

Table 2: RestorationInfo in the API Definition According to Some Example Embodiments of the Invention Whenever S-CSCF gets restarted or lost registration info and the S-CSCF receives a request for the subscriber (e.g. SIP INVITE), it triggers restoration procedure from UDM. As the restoration information stored in UDM has both registration info and subscription data for that UE (identified e.g. by IMPU) both will be restored by S-CSCF.

Once restoration is complete, S-CSCF may modify the subscription using PATCH Operation with one or more of the following parameters:

nfInstanceId monitoredResourceUris callbackReference expiry time

Typically, the PATCH operation comprises at least the first three of these parameters.

In this way, subscriptions including individual subscriber's (user's) IMS SDM subscription will be maintained in UDM and still be used after the subscription information was lost in S-CSCF. In this process, subscription data for groups of UEs or independent from any UE may be restored, too. As an alternative or in addition, S-CSCF may run an additional process (e.g. periodically or triggered by a process restart) to restore subscriptions not being related to an individual user.

The following description of some solutions according to some example embodiments of the invention is related to subscriptions to notifications triggered by changes of IMS SDM Subscriber Level data. They are typically specific to a UE. However, the invention is not limited to IMS SDM Subscriber Level data. It may be applied to any data stored in the user data repository, independent of whether they are related to one user, a group of users, or not at all user related.

In UE IMS registration flow, after successful scscf-registration & scscf-restoration-info (through PUT request) in UDM (or an update thereof), for that subscriber, S-CSCF performs subscription for UE and/or shared data (i.e. subscribes to notifications caused by changes of UE data and/or shared data). Once this is successful, S-CSCF has both registration info and subscription data for that subscriber.

Figure 3:
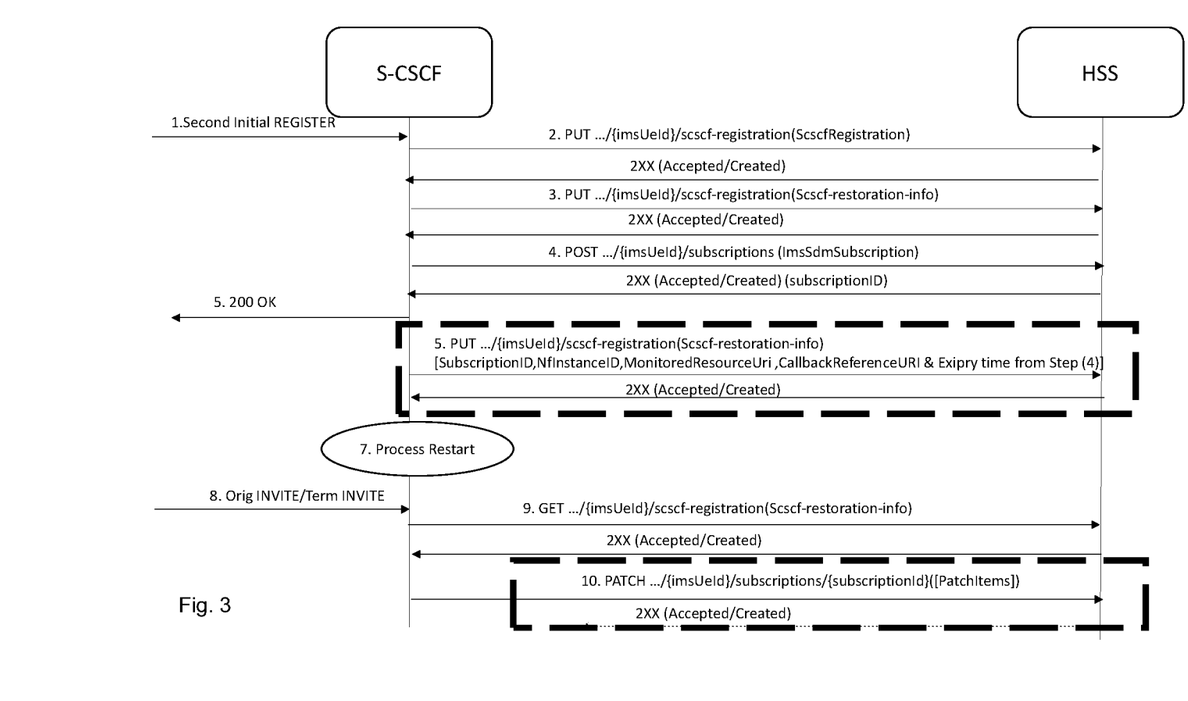
FIG. 3 shows a message flow according to solution 1 of some example embodiments of the invention.

Solution 1: Storing of Restoration Info is Once Again Updated After Subscription Solution 1 is shown in FIG. 3. The message flow starts after successful "Authenticated REGISTER" (shown in FIG. 1). Messages 1 to 5 are the same as those described with respect to FIG. 2. Messages 7 and 8 correspond to messages 6 and 7 of FIG. 2.

1. S-CSCF receives Register from UE with auth information.
2. The S-CSCF sends HTTP2 PUT request for resource representing the UE's S-CSCF registration to update or create S-CSCF registration information. The S-CSCF shall check whether there is a reg-id parameter in the Contact header in the SIP REGISTER message. If a reg-id parameter exists, the S-CSCF shall indicate to the HSS that the registration is related to a multiple registration as specified in clause 4.2.3 of 3GPP TS 23.380.
    The HSS updates the scscfRegistration resource by replacing it with the received resource information (e.g. S-CSCF name, state of the related IMS public identity based on the imsRegistrationType received) and responds with "204 No Content" or "200 OK" with the updated resource information and HSS supported features.
3. The S-CSCF sends a PUT request to the resource representing the UE's S-CSCF restoration information to create S-CSCF restoration information. The restoration info comprises registration info. However, it does not comprise subscription info because, at this time, S-CSCF did not subscribe to a notification from HSS. HSS stores the received S-CSCF restoration info and responds with HTTP Status Code "201 created".
4. S-CSCF (service consumer) sends a POST request to the HSS (parent resource, service provider) comprising a collection of subscriptions ( . . . /{imsUeId}/sdm-subscriptions), to create a subscription as present in message body.

The HSS responds with "201 Created" with the message body containing a representation of the created subscription. The Location HTTP header shall contain the URI of the created subscription (subscription ID).

5. S-CSCF sends 200 OK in response to the REGISTER message 1. This step can done before 4 as well, depending on implementation.

6. S-CSCF repeats the PUT request of message 3 to store restoration info in HSS. However, this time, the restoration info comprises, in addition to the registration info, the subscription data of message 4. I.e., the subscription data comprise the subscription ID received from HSS in response to message 4, and the values of
  nfInstanceId: The NF instance id of the S-CSCF.
  callbackReference: S-CSCF URI provided for callback from Nhss/UDM.
  monitoredResourceUris: A set of URIs that identify the resources for which a change triggers a notification. The URI shall take the form of either an absolute URI or an absolute-path.
  expiry time: the time when the subscription expires.
For example, these values may be collected in a map (called e.g. imsSdmSubscription), as described hereinabove. However, they may be represented differently, depending on implementation.

In some example embodiments, the restoration info comprises the subscription ID and a subset of one or more of the values cited above. Typically, the restoration info comprises at least the first three values (nfInstanceId, callbackReference, and monitoredResourceUris). For the remaining values, S-CSCF may use default values upon restoration.

The sequence of messages 5 and 6 depends on implementation. I.e., 6 may follow 5, or 5 may follow 6, or they may be send simultaneously.

7. The S-CSCF processes have to be restarted such that registration info and subscription data are lost.

8. S-CSCF receives another request (e.g. Invite) for the UE.

9. Since S-CSCF does not have registration info for the UE, it retrieves the registration info from HSS by GET request to the restoration info stored in the HSS. HSS provides the restoration info comprising the registration info by 2XX response. The restoration info comprises not only registration info but also subscription data. Thus, S-CSCF may restore the subscription data, too, and continue using the subscriptions created by message 4.

10. If needed (optional), the S-CSCF sends a PATCH request to the resource identified by the URI (Subscription ID) previously received during subscription creation.

Solution 2: Storing of Restoration is Done Post Subscription

Figure 4:
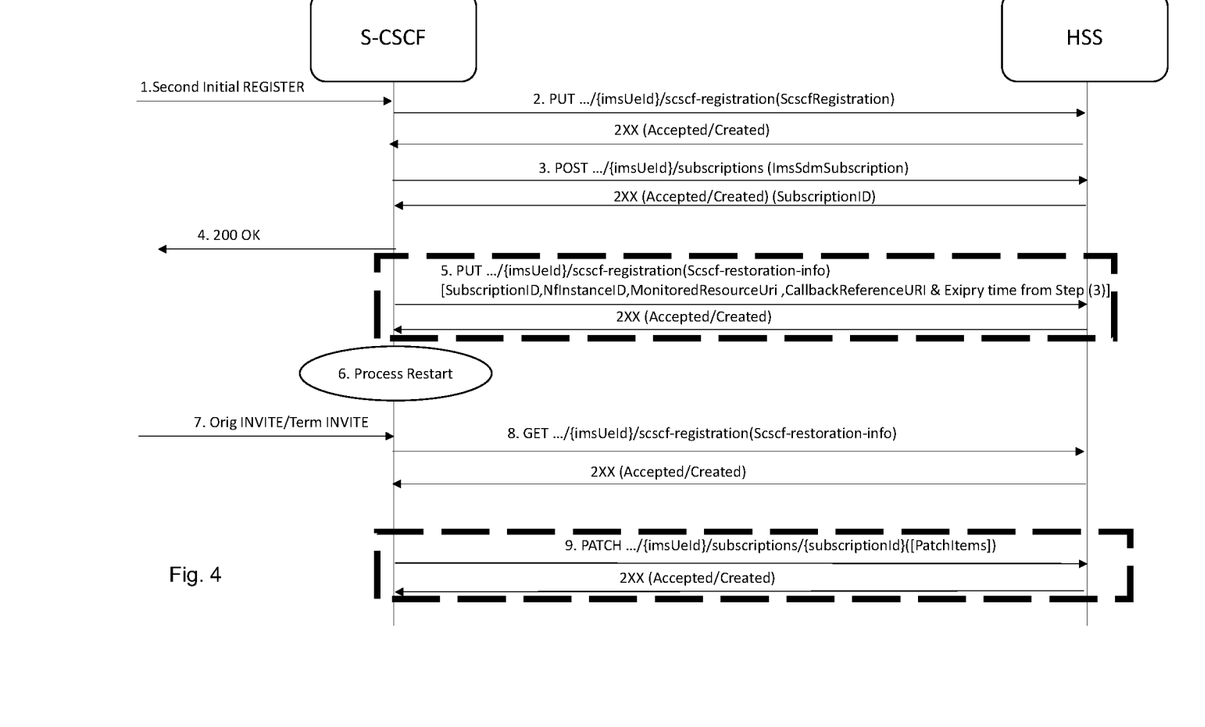
FIG. 4 shows a message flow according to solution 2 of some example embodiments of the invention.

Solution 2 is shown in FIG. 4. The message flow starts after successful "Authenticated REGISTER" (shown in FIG. 1). Messages 1, 2, 6, and 7 are the same as those described with respect to FIG. 2. Message 4 correspond to messages 5 of FIG. 2. While according to solution 1, S-CSCF stores the restoration info twice in HSS (messages 3 and 5 of FIG. 3), according to solution 2 S-CSCF stores the restoration info only once in HSS (message 5 of FIG. 4).

1. S-CSCF receives Register from UE with auth information.

2. The S-CSCF sends HTTP2 PUT request for resource representing the UE's S-CSCF registration to update or create S-CSCF registration information. The S-CSCF shall check whether there is a reg-id parameter in the Contact header in the SIP REGISTER message. If a reg-id parameter exists, the S-CSCF shall indicate to the HSS that the registration is related to a multiple registration as specified in clause 4.2.3 of 3GPP TS 23.380.

The HSS updates the scscfRegistration resource by replacing it with the received resource information (e.g. S-CSCF name, state of the related IMS public identity based on the imsRegistrationType received) and responds with "204 No Content" or "200 OK" with the updated resource information and HSS supported features.

3. S-CSCF (service consumer) sends a POST request to the HSS (parent resource, service provider) comprising a collection of subscriptions ( . . . /{imsUeId}/sdm-subscriptions), to create a subscription as present in message body.

The HSS responds with "201 Created" with the message body containing a representation of the created subscription. The Location HTTP header shall contain the URI of the created subscription (Subscription ID).

4. S-CSCF sends 200 OK in response to the REGISTER message 1.

5. S-CSCF sends a PUT request to store restoration info in HSS. The restoration info comprises, in addition to the registration info, the subscription data of message 3. I.e., the subscription data comprise the subscription ID received from HSS in response to message 3, and the values of
  nfInstanceId: The NF instance id of the S-CSCF.
  callbackReference: S-CSCF URI provided for callback from Nhss/UDM.
  monitoredResourceUris: A set of URIs that identify the resources for which a change triggers a notification. The URI shall take the form of either an absolute URI or an absolute-path.
  expiry time: the time when the subscription expires.
For example, these values may be collected in a map (called e.g. imsSdmSubscription), as described hereinabove. However, they may be represented differently, depending on implementation.

In some example embodiments, the restoration info comprises the subscription ID and a subset of one or more of the values cited above. Typically, the restoration info comprises at least the first three values (nfInstanceId, callbackReference, and monitoredResourceUris). For the remaining values, S-CSCF may use default values upon restoration.

6. The S-CSCF processes have to be restarted such that registration info and subscription data are lost.

7. S-CSCF receives another request (e.g. Invite) for the UE.

8. Since S-CSCF does not have registration info for the UE, it retrieves the registration info from HSS by GET request to the restoration info stored in the HSS. HSS provides the restoration info comprising the registration info by 2XX response. The restoration info comprises not only registration info but also subscription data. Thus, S-CSCF may restore the subscription data, too, and continue using the subscriptions created by message 4.

9. If needed (optional), the S-CSCF sends a PATCH request to the resource identified by the URI (Subscription ID) previously received during subscription creation.

Figure 5:
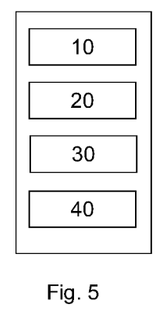
FIG. 5 shows an apparatus according to an example embodiment of the invention.
Figure 6:
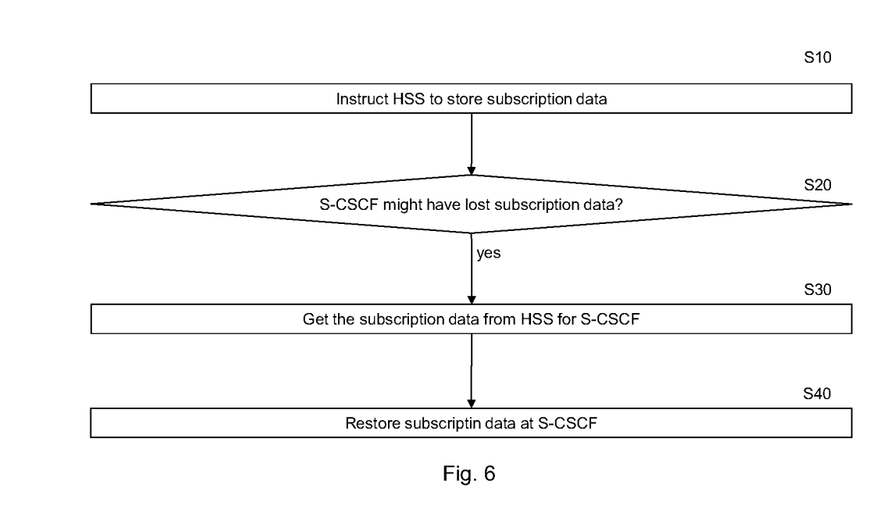
FIG. 6 shows a method according to an example embodiment of the invention.

FIG. 5 shows an apparatus according to an example embodiment of the invention. The apparatus may be a call session control function such as a S-CSCF, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for instructing 10, means for monitoring 20, means for getting 30, and means for restoring 40. The means for instructing 10, means for monitoring 20, means for getting 30, and means for restoring 40 may be an instructing means, monitoring means, getting means, and restoring means, respectively. The means for instructing 10, means for monitoring 20, means for getting 30, and means for restoring 40 may be an instructor, monitor, getter, and restorer, respectively. The means for instructing 10, means for monitoring 20, means for getting 30, and means for restoring 40 may be an instructing processor, monitoring processor, getting processor, and restoring processor, respectively.

The means for instructing 10 instructs a user data repository to store subscription data (S10). The subscription data comprise information on a notification from the user data repository to which a call session control function (e.g. S-CSCF) subscribed by a subscription. For example, the subscription data may comprise information used to create a notification from the user data (user profiles). However, in general, the subscription data may comprise information used to create a notification from any data stored in the user data repository. Typically, the call session control function instructs the user data repository to store subscription data. However, in an alternative option, the user data repository stores the subscription data for restoring of the S-CSCF once it created the subscription.

The means for monitoring 20 monitors whether the call session control function has an indication that the call session control function might have lost the subscription data (S20). For example, if the call session control function lost the registration info for a user, it is an indication that the call session control function might have lost the subscription data. As another option, the means for monitoring may monitor if certain processes have to restart. Such a restart may be considered as the indication that the call session control function might have lost the subscription data. As still another option, the operator may input such an indication. As yet another option, the means for monitoring may assume periodically that the call session control function might have lost the subscription data.

It is not necessary that the call session control function actually has lost the subscription data. For example, even if the call session control function lost the registration info, it might not have lost the subscription data. Also, the call session control function might not have subscribed to any notifications. Thus, it cannot have lost any subscription data.

If the call session control function has the indication that the call session control function might have lost the subscription data (S20=yes), the means for getting 30 gets the subscription data from the user data repository for the call session control function (S30). Then, the means for restoring 40 restores the subscription data at the call session control function according to the subscription data got from the user data repository (S40). I.e., the call session control function may use the subscription data as if they were never lost.

Figure 7:
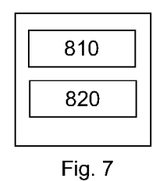
FIG. 7 shows an apparatus according to an example embodiment of the invention.

FIG. 7 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to FIG. 6 and related description.

Some example embodiments are explained with respect to a 5G core network. However, the invention is not limited to 5G. It may be used in other service based networks, too, e.g. in forthcoming generations of 3GPP core networks such as 6G, 7G, etc. The invention is not limited to 3GPP core networks but may be used in access networks and non-3GPP networks, too.

The invention is described using HTTP requests (PUT, POST, GET, PATCH, etc.) on the SBI between S-CSCF and HSS (UDM). The version of HTTP is not limited. Also, another protocol providing similar functionality may be used.

A user data repository stores at least a user profile. HSS and UDM are examples of user data repositories. In other networks, the user data repository may have a different name, but the invention is applicable to such user repositories, too.

The invention is not limited to S-CSCF. Some example embodiments of the invention may be applied to other Functions, such as AS.

One piece of information may be transmitted in one or plural messages from one entity to another entity. Each of these messages may comprise further (different) pieces of information.

Further examples will be for understanding the invention are described in the following.

Example 1. An apparatus comprising one or more processors, and memory storing instructions that, when executed by the one or more processors, cause the apparatus to:
  instruct a user data repository to store subscription data, wherein the subscription data comprise information on a notification from the user data repository to which a call session control function subscribed by a subscription;
  monitor whether the call session control function has an indication that the call session control function might have lost the subscription data;
  get the subscription data from the user data repository for the call session control function if the call session control function has the indication that the call session control function might have lost the subscription data;
  restore the subscription data at the call session control function according to the subscription data got from the user data repository.

Example 2. The apparatus according to Example 1, wherein the subscription data comprise a subscription identifier of the subscription and at least one of:
  an instance identification of the call session control function;
  a callback reference for the notification;
  an identification of a resource of the user data repository for which a change triggers the notification; and
  an expiry time of the subscription.

Example 3. The apparatus according to any of Examples 1 and 2, wherein the subscription is specific for a user of the call session control function.

Example 4. The apparatus according to Example 3, wherein the subscription data and information on a registration of the user at the call session control function are both attributes of a restoration information, and at least one of the following:
- the user data repository is instructed to store the subscription data by instructing the user data repository to store the restoration information; and
- the subscription data are got from the user data repository for the call session control function by getting the restoration information from the user data repository for the call session control function.

Example 5. The apparatus according to any of Examples 1 to 4, wherein the call session control function instructs the user data repository to store the subscription data.

Example 6. A method comprising:
- instructing a user data repository to store subscription data, wherein the subscription data comprise information on a notification from the user data repository to which a call session control function subscribed by a subscription;
- monitoring whether the call session control function has an indication that the call session control function might have lost the subscription data;
- getting the subscription data from the user data repository for the call session control function if the call session control function has the indication that the call session control function might have lost the subscription data;
- restoring the subscription data at the call session control function according to the subscription data got from the user data repository.

Example 7. The method according to Example 6, wherein the subscription data comprise a subscription identifier of the subscription and at least one of:
- an instance identification of the call session control function;
- a callback reference for the notification;
- an identification of a resource of the user data repository for which a change triggers the notification; and
- an expiry time of the subscription.

Example 8. The method according to any of Examples 6 and 7, wherein the subscription is specific for a user of the call session control function.

Example 9. The method according to Example 8, wherein the subscription data and information on a registration of the user at the call session control function are both attributes of a restoration information, and at least one of the following:
- the user data repository is instructed to store the subscription data by instructing the user data repository to store the restoration information; and
- the subscription data are got from the user data repository for the call session control function by getting the restoration information from the user data repository for the call session control function.

Example 10. The method according to any of Examples 6 to 9, wherein the call session control function instructs the user data repository to store the subscription data.

Example 11. A computer program product comprising a set of instructions which, when executed on an apparatus, is configured to cause the apparatus to carry out the method according to any of Examples 6 to 10.

Example 12. The computer program product according to Example 11, embodied as a computer-readable medium or directly loadable into a computer.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software.

That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a call session control function, such as a S-CSCF, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the advantageous embodiments of the present invention. However, it should be noted that the description of the embodiments is given by way of example only and that various modifications may be made without departing from the scope of the invention as defined by the appended claims.

The invention claimed is:

1. An apparatus comprising:
one or more processors, and memory storing instructions of a call session control function (CSCF) that, when executed by the one or more processors, cause the apparatus to perform:
receiving a request to register a user equipment (UE);
sending, to a subscriber data management (SDM) system, a request to store, in restoration information, registration information related to registration of the UE;
sending, to the SDM system, a request for creation of a subscription for the UE for notification of data change in the SDM system;
in response to sending the request for creation of the subscription, receiving, from the SDM system, Internet Protocol Multimedia Subsystem (IMS) SDM subscription data, wherein the IMS SDM subscription data comprises at least a subscription identifier of the subscription;
sending an additional instruction to the SDM system to update the restoration information to include the IMS SDM subscription data, wherein the subscription comprises a subscription to a notification of data change in the SDM system, wherein the data change relates to resource identification or resource reachability, and wherein the IMS SDM subscription data further comprises at least one of:
    an instance identification of the call session control function;
    a callback reference for the notification;
    an identification of a resource of the SDM system for which a change triggers the notification; or
    an expiry time of the subscription;
sending, to the SDM system, a request for the restoration information comprising the registration information and the IMS SDM subscription data based on receiving an indication that the call session control function has at least one of the following: restarted, lost the registration information, or lost the IMS SDM subscription data; and
receiving, at the CSCF, the restoration information comprising the registration information and the IMS SDM subscription data.

2. The apparatus according to claim 1, wherein the IMS SDM subscription data and the registration information are attributes of the restoration information, and at least one of the following:
    the SDM system is instructed to store the IMS SDM subscription data by instructing the SDM system to store the restoration information; or
    the IMS SDM subscription data from the SDM system for the call session control function is obtained by getting the restoration information from the SDM system for the call session control function.

3. The apparatus according to claim 1, wherein the apparatus is further caused to monitor whether the call session control function has the indication that the call session control function has at least one of the following: restarted, lost the registration information, or lost the IMS SDM subscription data.

4. A method for a call session control function (CSCF) comprising:
    receiving a request to register a user equipment (UE);
    sending, to a subscriber data management (SDM) system, a request to store, in restoration information, registration information related to registration of the UE;
    sending, to the SDM system, a request for creation of a subscription for the UE for notification of data change in the SDM system;
    in response to sending the request for creation of the subscription, receiving, from the SDM system, Internet Protocol Multimedia Subsystem (IMS) SDM subscription data, wherein the IMS SDM subscription data comprises at least a subscription identifier;
    sending an additional instruction to the SDM system to update the restoration information to include the IMS SDM subscription data, wherein the subscription comprises a subscription to a notification of data change in the SDM system, wherein the data change relates to resource identification or resource reachability, and wherein the IMS SDM subscription data further comprises at least one of:
        an instance identification of the call session control function;
        a callback reference for the notification;
        an identification of a resource of the SDM system for which a change triggers the notification; or
        an expiry time of the subscription;
    sending, to the SDM system, a request for the restoration information comprising the registration information and the IMS SDM subscription data based on receiving an indication that the call session control function has at least one of the following: restarted, lost the registration information, or lost the IMS SDM subscription data; and
    receiving, at the CSCF, the restoration information comprising the registration information and the IMS SDM subscription data.

5. The method according to claim 4, further comprising monitoring whether the call session control function has the indication that the call session control function has at least one of the following: restarted, lost the registration information, or lost the IMS SDM subscription data.

6. A non-transitory computer program product comprising a set of instructions of a call session control function (CSCF) which, when executed on an apparatus, is configured to cause the apparatus to carry out a method comprising:
    receiving a request to register a user equipment (UE);
    sending, to a subscriber data management (SDM) system, a request to store, in restoration information, restoration information related to registration of the UE;
    sending, to the SDM system, a request for creation of a subscription for the UE for notification of data change in the SDM system;
    in response to sending the request for creation of the subscription, receiving, from the SDM system, Internet Protocol Multimedia Subsystem (IMS) SDM subscription data, wherein the IMS SDM subscription data comprises at least a subscription identifier;
    sending an additional instruction to the SDM system to update the restoration information to include the IMS SDM subscription data, wherein the subscription comprises a subscription to a notification of data change in the SDM system, wherein the data change relates to resource identification or resource reachability, and wherein the IMS SDM subscription data further comprises at least one of:
        an instance identification of a call session control function;
        a callback reference for the notification;
        an identification of a resource of the SDM system for which a change triggers the notification; or
        an expiry time of the subscription;
    sending, to the SDM system, a request for the restoration information comprising the registration information and the IMS SDM subscription data based on receiving an indication that the call session control function has at least one of the following: restarted, lost the registration information, or lost the IMS SDM subscription data; and
    receiving, at the CSCF, the restoration information comprising the registration information and the IMS SDM subscription data.

7. The non-transitory computer program product according to claim 6, embodied as a computer-readable medium or directly loadable into a computer.

8. The non-transitory computer program product according to claim 6, wherein the IMS SDM subscription data and registration information on the registration of the UE at the call session control function are attributes of the restoration information, and at least one of the following:
    the SDM system is instructed to store the IMS SDM subscription data by instructing the SDM system to store the restoration information; or
    the IMS SDM subscription data from the SDM system for the call session control function is obtained by getting the restoration information from the SDM system for the call session control function.

9. The non-transitory computer program product according to claim 6, wherein the instructions are further configured to cause the apparatus to monitor whether the call session control function has the indication that the call session control function has at least one of the following: restarted, lost the registration information, or lost the IMS SDM subscription data.

10. The apparatus according to claim 1, wherein the additional instruction is sent to the SDM system to update the restoration information to include the IMS SDM subscription data for the user equipment, after: (a) the registration of the user equipment and (b) the sending to the SDM system the instruction to store the restoration information comprising the registration information, wherein the registration information is for the user equipment.

11. The method according to claim 4, wherein the additional instruction is sent to the SDM system to update the restoration information to include the IMS SDM subscription data for the user equipment, after: (a) the registration of the user equipment and (b) the sending to the SDM system the instruction to store the restoration information comprising the registration information, wherein the registration information is for the user equipment.

12. The non-transitory computer program product according to claim 6, wherein the additional instruction is sent to the SDM system to update the restoration information to include the IMS SDM subscription data for the user equipment, after: (a) the registration of the user equipment and (b) the sending to the SDM system the instruction to store the restoration information comprising the registration information, wherein the registration information is for the user equipment.

13. The apparatus according to claim 1, wherein the apparatus is further caused to perform, in response to the receiving the restoration information, sending a request to a resource identified in the IMS SDM subscription data included in the received restoration information.

14. The method according to claim 4, further comprising, in response to the receiving the restoration information, sending a request to a resource identified in the IMS SDM subscription data included in the received restoration information.

15. The non-transitory computer program product according to claim 6, wherein the instructions are further configured to cause the apparatus to, in response to the receiving the restoration information, sending a request to a resource identified in the IMS SDM subscription data included in the received restoration information.

16. The apparatus according to claim 1, wherein the request to store, in the restoration information, the information related to registration of the UE is sent via a PUT request, the request for the creation of the subscription is sent via a POST request, and the additional instruction is sent via an additional POST request.

17. The method according to claim 4, wherein the request to store, in the restoration information, the information related to registration of the UE is sent via a PUT request, the request for the creation of the subscription is sent via a POST request, and the additional instruction is sent via an additional POST request.

18. The non-transitory computer program product according to claim 6, wherein the request to store, in the restoration information, the information related to registration of the UE is sent via a PUT request, the request for the creation of the subscription is sent via a POST request, and the additional instruction is sent via an additional POST request.

* * * * *